US009127664B2

(12) United States Patent
Stabe et al.

(10) Patent No.: US 9,127,664 B2
(45) Date of Patent: Sep. 8, 2015

(54) METHOD OF MANUFACTURING A HOUSING

(75) Inventors: James Richard Stabe, San Diego, CA (US); Jess Lee Freeman, Poway, CA (US); Aziz Asgharzadeh-Fozi, Solana Beach, CA (US)

(73) Assignee: Solar Turbines Incorporated, San Diego, CA (US)

( * ) Notice: Subject to any disclaimer, the term of this patent is extended or adjusted under 35 U.S.C. 154(b) by 712 days.

(21) Appl. No.: 13/407,454

(22) Filed: Feb. 28, 2012

(65) Prior Publication Data

US 2013/0224052 A1     Aug. 29, 2013

(51) Int. Cl.
*B23P 15/00*     (2006.01)
*F04B 39/12*     (2006.01)

(52) U.S. Cl.
CPC ............... *F04B 39/121* (2013.01); *B23P 15/00* (2013.01); *Y10T 29/49* (2015.01); *Y10T 29/49236* (2015.01)

(58) Field of Classification Search
CPC .. B23P 15/00; Y10T 29/49236; F04B 39/121
USPC ............ 29/527.2, 527.6, 527.3, 888, 888.02, 29/888.021; 415/201, 213.1
See application file for complete search history.

(56) References Cited

U.S. PATENT DOCUMENTS

| 4,137,006 | A | 1/1979 | Becker |
| 4,551,065 | A | 11/1985 | Becker |
| 5,730,812 | A * | 3/1998 | Lawrence ................... 148/590 |
| 6,071,073 | A * | 6/2000 | Maier ........................ 415/150 |
| 6,506,018 | B1 | 1/2003 | Brennan |
| 7,278,834 | B2 * | 10/2007 | Herrick et al. .............. 417/363 |
| 2005/0109013 | A1 * | 5/2005 | Eleftheriou et al. ......... 60/226.1 |
| 2009/0205360 | A1 * | 8/2009 | Haley et al. .................. 62/498 |

FOREIGN PATENT DOCUMENTS

GB      1 261 237      1/1972
WO   WO 2010/012252   2/2010

* cited by examiner

*Primary Examiner* — Sarang Afzali
*Assistant Examiner* — Ruth G Hidalgo-Hernande
(74) *Attorney, Agent, or Firm* — Finnegan, Henderson, Farabow, Garrett & Dunner, LLP

(57) ABSTRACT

A method of manufacturing a plurality of housings. The method may include maintaining an inventory of initial products. Each of the initial products may include a central hollow body extending along a longitudinal axis and monolithically formed with at least one of a suction passage and a discharge passage. Each of the products may have a same initial length. The method may further include receiving a first order for a first housing having a first length and machining a first product to the first length to form the first housing. Also, the method may include receiving a second order for a second housing having a second length and machining a second product to the second length to form the second housing. The first length and the second length may be different.

7 Claims, 4 Drawing Sheets

METHOD OF MANUFACTURING A HOUSING

TECHNICAL FIELD

The present disclosure relates generally to methods of assembling a product, and more particularly, to methods for efficiently assembling a housing.

BACKGROUND

Large products, often those associated with heavy machinery and the like, are often cast from steel. Such products are often produced by suppliers required to meet the demands of numerous clients having varying product needs. For example, a product may include a compressor housing. A supplier may be required to produce a number of different compressor housings having varying dimensions and attributes. Such a demand may require expensive tooling and machining devices equipped for such variances. Indeed, in order to provide various different compressor housings, a supplier may be required to purchase, make, or otherwise maintain a number of different tooling patterns thereby increasing costs.

Additionally, a supplier may be provided with a very short turn-around time for completion of the product. Increasingly narrow lead times often require larger amounts of inventory available for supplier use. Suppliers may incur significant costs to ensure sufficient inventory of varying products are available.

U.S. Pat. No. 4,551,065 to Becker (the '065 patent) discloses a standard casing formed by a vertically split casing 60. The casing 60 includes an inlet stub end and an outlet stub end for attachment to an inlet passage and an outlet passage, respectively. Upon selection of a desired shell thickness, the stub ends may be trimmed back to match the thickness of the shell section and its inner diameter may be enlarged to match an inner diameter of the passage to be attached. However, the method of manufacture of the '065 patent may still suffer from manufacturing inefficiencies.

SUMMARY

Embodiments of the present disclosure may be directed to a method of manufacturing a plurality of housings. The method may include maintaining an inventory of initial products. Each of the initial products may include a central hollow body extending along a longitudinal axis and monolithically formed with at least one of a suction passage and a discharge passage. Each of the products may have a same initial length. The method may further include receiving a first order for a first housing having a first length and machining a first product to the first length to form the first housing. Also, the method may include receiving a second order for a second housing having a second length and machining a second product to the second length to form the second housing. The first length and the second length may be different.

In further embodiments, the present disclosure may be directed to a method of producing a compressor housing. The method may include casting an initial product. The initial product may include a central hollow body extending along a longitudinal axis and monolithically formed with a suction passage and a discharge passage. The initial product may have a first length. The method may further include dividing the initial product into a suction passage portion and a discharge passage portion. The suction passage portion may include the suction passage and the discharge passage portion may include the discharge portion. The method may further include machining at least one of the suction passage portion and the discharge passage portion and reattaching the suction passage portion and the discharge passage portion to each other to form a final product. The final product may have a second length.

Further embodiments of the present disclosure may include a compressor housing. The compressor housing may include an elongate central body having a length extending along a longitudinal axis and having a suction nozzle and a discharge nozzle monolithically cast therewith. Each of the suction nozzle and the discharge nozzle may extend perpendicularly to the longitudinal axis. The compressor housing may further include a joint extending peripherally about the body between the suction nozzle and discharge nozzle.

DETAILED DESCRIPTION

Figure 1:
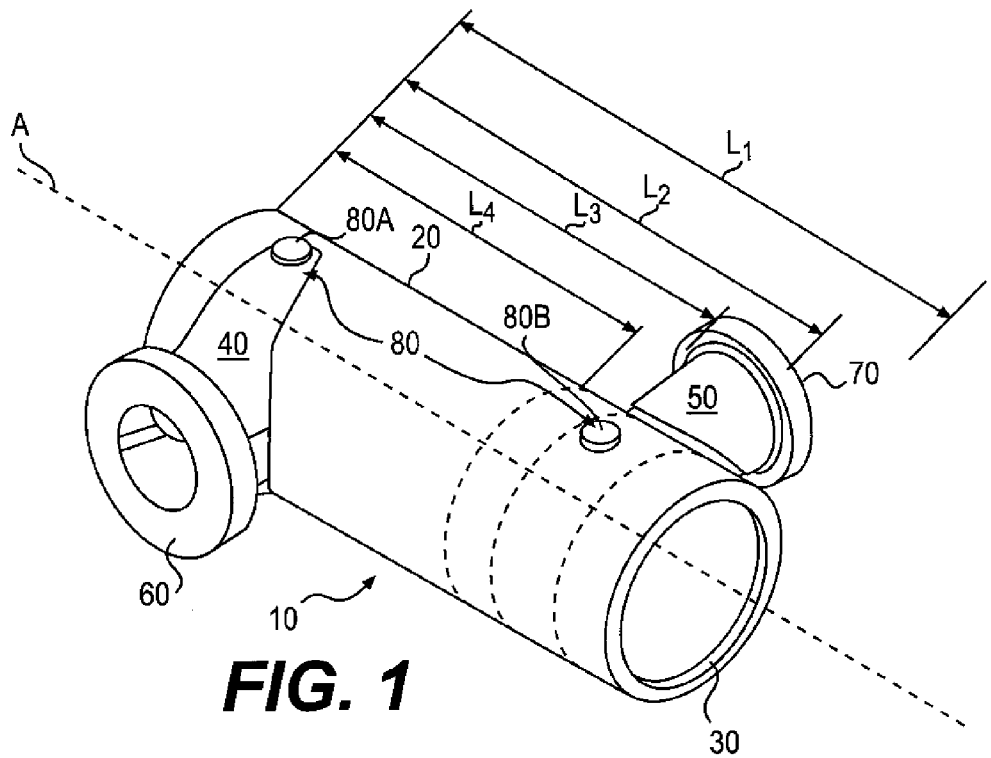
FIG. 1 is an illustration of an exemplary initial product housing having varying lengths.

FIG. 1 illustrates an exemplary housing 10. Housing 10 may be constructed of cast steel. Also, housing 10 may include an elongate central body 20. As shown in FIG. 1, body 20 may include a circular cross-sectional shape. Alternatively, body 20 may include any appropriate cross-sectional shape such as, for example, an oval, rectangular, and/or triangular cross-sectional shape. The center of body 20 may include a through-bore 30. Bore 30 may be sufficiently wide so as to accommodate a component therein. Such a component may include a compressor bundle or package (not shown) configured for insertion within the bore 30. As such, bore 30 may include any appropriate dimensions configured to receive the compressor bundle therein. For example, bore 30 may include a sufficient diameter so as to accommodate a compressor bundle while maintaining a sufficient wall thickness of body 20 so as to allow for increased pressure within body 20 caused during operation of a compressor bundle. For example, a wall thickness of body 20 may be sufficiently thick so as to withstand internal pressures of up to about 6,250 psi.

As shown in FIG. 1, body 20 also includes a suction nozzle or passage 40 and a discharge nozzle or passage 50. Each of suction passage 40 and discharge passage 50 may include a bore extending through body 20 and in communication with bore 30. Suction passage 40 may be configured to communicate a fluid, such as, for example, air, from a location external of body 20 to a compressor bundle or other component located within bore 30. Discharge passage 50, on the other hand, may be configured to communicate a fluid, such as, for example, air, from a location inside of body 20 to a location external of body 20.

Suction passage 40 may extend perpendicularly from a longitudinal axis A of body 20. For example, suction passage 40 may include a cylindrical passage extending perpendicularly from axis A and terminating in a suction passage end face 60. Suction passage 40 may be cast integrally, i.e. monolithically with body 20 in a unitary unbroken structure. Such an integrally formed structure may improve strength and resistance to breakage of suction passage 40.

Similarly to suction passage 40, discharge passage 50 may extend perpendicularly to the longitudinal axis A of body 20. For example, discharge passage 50 may include a cylindrical passage extending perpendicularly to the longitudinal axis A and terminating in a discharge passage end face 70. Discharge passage 50 may be cast integrally, i.e. monolithically with body 20 in a unitary unbroken structure. Such an integrally formed structure may improve strength and resistance to breakage of discharge passage 50.

It should be noted that each of suction passage 40 and discharge passage 40 may be directed at any desired orientation with respect to the longitudinal axis A. For example, one or both of suction passage 40 and discharge passage 50 may be oriented at a 45° angle with respect to the longitudinal axis A. Alternative exemplary embodiments may orient one or both of suction passage 40 and discharge passage 50 along any appropriate angle as desired.

As shown in FIG. 1, body 20 may be cast so as to include one or more raised bosses 80. For example, body 20 may be cast so as to include at least four bosses 80, having two bosses 80 on a "top" of body 20 and two on a "bottom" of body 20 (not shown). A first boss 80A of the at least four bosses 80, may be formed along body 20 proximate the suction passage 40. Likewise, a second boss 80B of the at least four bosses 80 may be formed proximate the discharge passage 50. A third and fourth boss of the at least four bosses 80 (not shown) may be disposed on a bottom of body 20 in a mirror image relationship to first boss 80A and second boss 80B, respectively. Each of the bosses, including first boss 80A and the second boss 80B, may be included so as to provide an area of increased thickness having a flattened terminating end along body 20. These areas of increased thickness along body 20 may be utilized to locate drains, exhaust passages, and/or openings along body 20 as is known in the art. That is, each boss 80, including first boss 80A and second boss 80B, may be machined down, after casting of body 20, to provide, for example, drains. That is, each boss 80 may be drilled, or otherwise processed, therethrough so as to form a drain. Such drains may be configured to communicate fluid, such as, for example, air, from within body 20 to a location external of body 20. Because each of the bosses 80 provide an area of increased thickness having a flattened terminating end, these areas are readily machined to form the aforementioned drains. That is, due to the inclusion of bosses 80 having increased thickness and flattened terminating ends, machining processes, such as drilling, may be easily performed.

As shown in FIG. 1, body 20 may include a variable length. That is, as will be explained in further detail below, body 20 may be machined to include any appropriate length. By way of non-limiting example, body 20 may have any appropriate length such as L1, L2, L3, or L4, L1 being the maximum or largest length (length L1 may correspond to the largest length a specific order may demand). For exemplary purposes only, each of lengths L1, L2, L3, and L4 may be substantially different from one another and range between about five feet (1.52 meters) to about fifteen feet (4.57 meters). That is, L4 may correspond to a length of five feet (1.52 meters) while L1 may correspond to a length of fifteen feet (4.57 meters). These lengths may be chosen based on a variety of factors, including, but not limited to, demands of the end product. Indeed, components configured for insertion within body 20 such as compressor bundles, may include varying dimensions, such as length. As such, body 20 as described below, may be machined to have a length appropriate to house a component therein. It should be noted that body 20 may include any number of differing lengths. That is, while the exemplary embodiment of FIG. 1 indicates body 20 may have four different lengths, a greater or lesser number of varying lengths may be employed.

Figure 2:
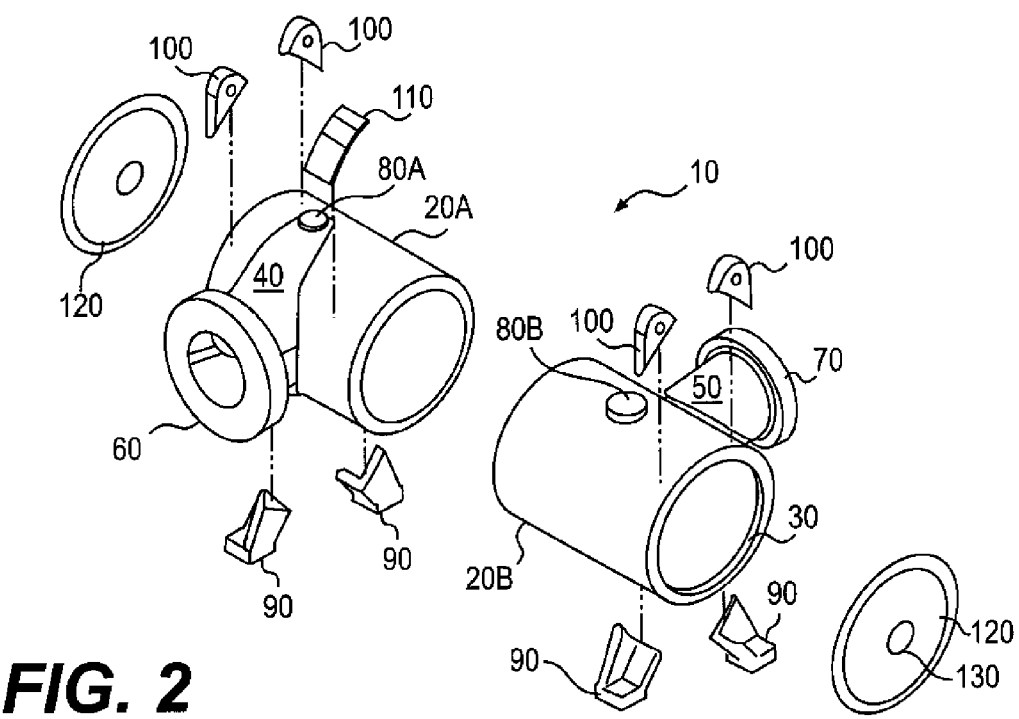
FIG. 2 is an exploded view of an exemplary completed housing.

FIG. 2 is an exploded view of an exemplary completed housing 10. As shown in FIG. 2, and as will be discussed in further detail below, body 20 may be machined by cutting body 20 perpendicularly to the longitudinal axis A to form suction passage portion 20A, and discharge passage portion 20B. It is to be noted that body 20 may be cut along any non-perpendicular angle with respect to the longitudinal axis A. For example, body 20 may be cut along a plane extending at a 45° angle with respect to the longitudinal axis. Alternatively, body 20 may be cut along any angle as desired according to a particular need. After forming suction passage portion 20A and discharge passage portion 20B, one or both of suction passage portion 20A and discharge passage portion 20B may be machined, i.e. grinded or otherwise processed to reduce the length of the portion(s) and/or alter an orientation of suction passage 40 and/or discharge passage 50. That is, in order to machine body 20 to a desired overall length that is less than a maximum length L1 of body 20, for example, L2, L3, or L4, either or both of suction passage portion 20A and discharge passage portion 20B may be processed to remove length such that the length of suction passage portion 20A and discharge passage portion 20B, when combined, equals a desired length. Alternatively, in an embodiment requiring a change in orientation of one or both of suction passage 40 and discharge passage 50 and desiring a final length of L1, body 20 may be cast to have an originally cast length of L0, L0 being longer than the maximum length L1. Such excess length may permit the body 20 to be cut to form suction passage portion 20A and discharge passage portion 20B, reorientation of suction passage 40 and/or discharge passage 50, machining of one or both of suction passage portion 20A and discharge passage 20B, and reattachment of suction passage portion 20A to discharge passage portion 20B (or vice versa). In order to recombine suction passage portion 20A and discharge passage portion 20B, a welding process may be utilized. That is suction passage portion 20A may be welded to discharge passage portion 20B, or vice versa. It is to be noted that if the desired length is equal to the maximum length L1 of body 20 and no reorientation of suction passage 40 and discharge passage 50 is desired, body 20 need not be processed to form suction passage portion 20A and discharge passage portion 20B.

As shown in FIG. 2, a completed housing 10 may be constructed by the inclusion, i.e. attachment of a number of auxiliary component or parts. Such auxiliary parts may include, but are not limited to, a plurality of support feet 90, one or more loops 100, and one or more face plates 110. Support feet 90 may be arranged along body 20 (including suction passage portion 20A and discharge passage portion 20B) so as to support body 20. For example, as shown in FIG. 2, four support feet 90 may be arranged along body 20, with two feet 90 proximate suction passage 40 and two feet proximate discharge passage 50. Alternatively, any appropriate arrangement and number of feet 90 may be employed. For example, an exemplary embodiment may include three feet 90 arranged in a triangular fashion, or six or eight feet arranged in rows along body 20. Indeed, any appropriate number of feet 90 arranged so as to support body 20 may be utilized. It is to be noted that although FIG. 2 depicts body 20 extending horizontally with feet 90 arranged on a lower or bottom surface thereof, other arrangements may be employed. For example, body 20 may be arranged so as to extend vertically, i.e. to "stand up" on one end of body 20. In such an exemplary embodiment, feet 90 may be arranged on such an end surface of body 20 so as to support body 20.

As shown in FIG. 2, loops 100 may be positioned along body 20 (including suction passage portion 20A and discharge passage portion 20B). For example, as shown in FIG. 2, four loops 100 may be arranged along body 20, with two loops 100 proximate suction passage 40 and two loops 100 proximate discharge passage 50. Alternatively, any appropriate number and arrangement of loops 100 may be employed. An exemplary embodiment may include three loops 100 arranged in a triangular fashion, or six or eight loops 100 arranged in rows along body 20. Loops 100 may be used to facilitate manipulation of body 20 during assembly, operation, or maintenance. That is, loops 100 may be utilized as lifting hooks. As such, manipulating machinery, i.e. a crane or other machinery sufficient to lift large loads may be attached to body via loops 100. Upon attachment, such manipulating machinery may lift or otherwise move body 20 as needed.

As shown in FIG. 2, one or more face plates 110 may be attached to body 20. Face plate 110 may be configured to convey information to a viewer, such as a manufacturer, maintenance engineer, operator, or the like. For example, the face plate 110 may be imprinted with information such as specifications of the housing 10 and/or a component housed therein, such as, for example, a compressor bundle. Alternatively or additionally, face plate 110 may be imprinted with information regarding maintenance operations, a commercial logo or emblem, a serial number, or the like. It is to be understood that any number of face plates 110 may be utilized to convey any information reasonably capable of being imprinted on such a face plate 110. Also, it is to be noted that any appropriate means may be used in order to imprint face plate(s) 110 with information. By way of non-limiting example, such means may include stamping, printing, and/or molding etc.

Each of feet 90, loops 100, and face plate(s) 110 may be attached to body 20 via any appropriate means. For example, each of feet 90, loops 100, and face plate(s) 110 may be attached to body via a welding process, bolting, or any other mechanical means. Indeed, upon selection of the appropriate length of body 20, and optionally following the attachment of suction passage portion 20A to discharge passage portion 20B (or vise versa), as will be discussed in further detail below, the auxiliary parts (feet 90, loops 100, and/or face plate(s) 110) may be welded to body 20. It is to be noted that, in an embodiment in which suction passage portion 20A and discharge passage portion 20B are formed, attachment of auxiliary parts (feet 90, loops 100, and/or face plate 110) may be conducted prior to attachment of suction passage portion 20A to discharge passage portion 20B (or vise versa).

Further, as shown in FIG. 2, one or more selectively removable end caps 120 may be provided. Indeed, each end cap 120 may be attached to an end of body 20, thereby enclosing a component, such as a compressor bundle, within bore 30 of body 20. End cap(s) 120 may prevent contaminants such as dust and the like from harming a component (i.e. compressor bundle) located within bore 30. As shown, each end cap 120 may include an opening or hole 130 therein. Opening 130 may be configured for the passage of a component part, such a compressor shaft, therethrough. Indeed, in an exemplary embodiment in which a compressor bundle is positioned within bore 30, a shaft of the compressor bundle may be permitted to extend through opening 130 one each of the of the one or more end caps 120.

As noted above, the one or more end caps 120 may be selectively removable. That is, each end cap 120 may be attached to body 20 in any appropriate non-permanent means, such as, for example, bolting or by use of screws, clasps, or the like. Such non-permanent means, however, must be sufficiently strong so as to withstand large internal pressures experienced within bore 30 without shearing off or otherwise breaking. Due to the non-permanent attachment of end cap(s) 120 to body 20, end cap(s) 120 may be removed to allow access to a component located within bore 30. This access may readily permit maintenance and/or replacement operations of any component located within body 20.

Figure 3:
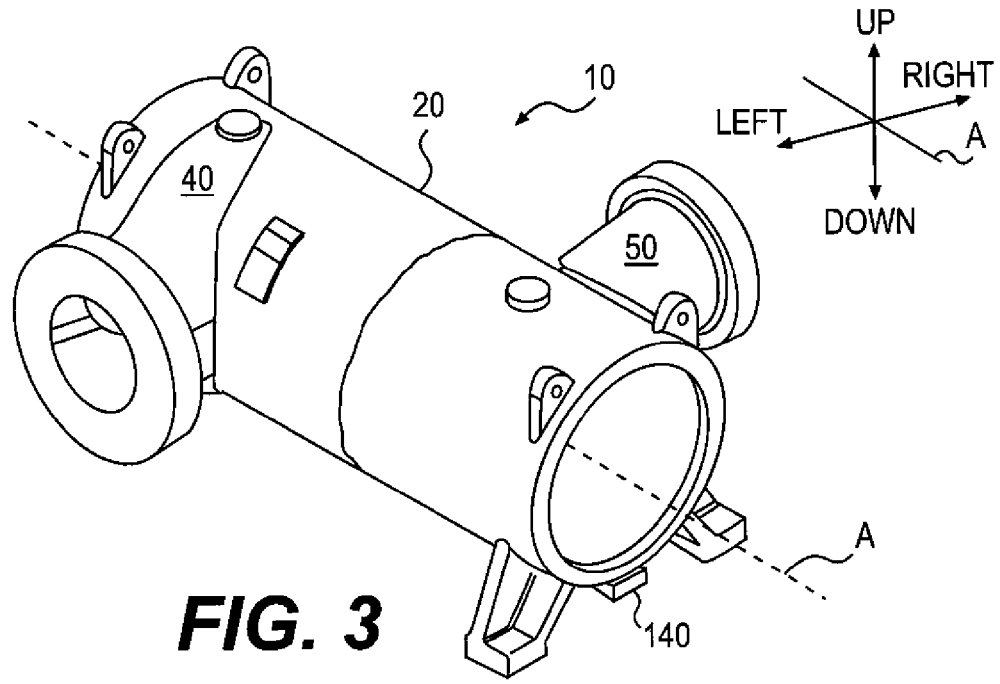
FIG. 3 is an illustration of the exemplary completed housing of FIG. 2.
Figure 4:
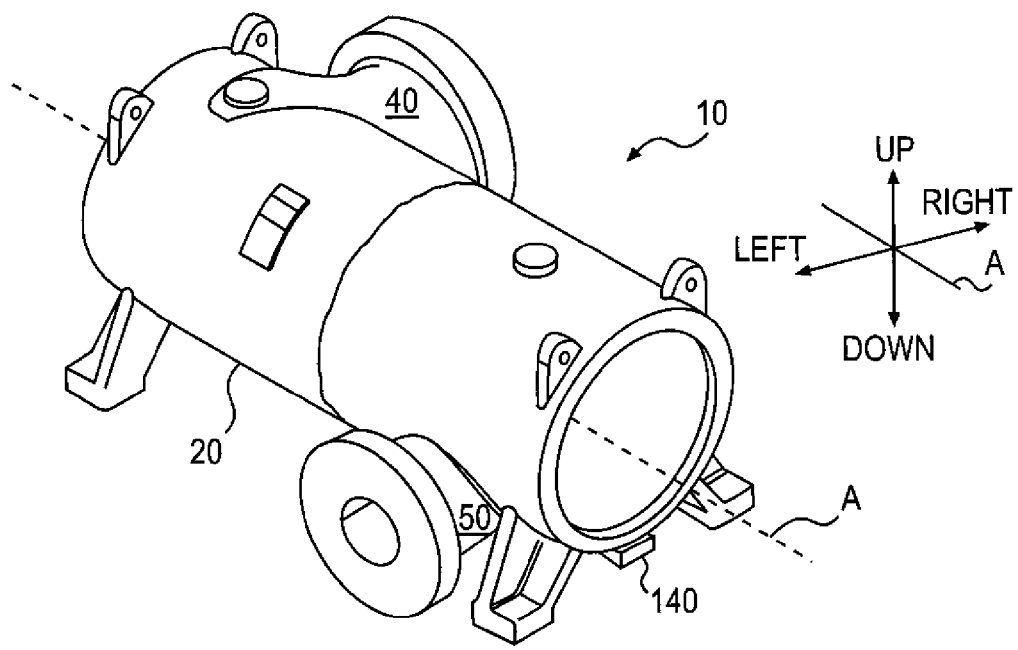
FIG. 4 is an illustration of a completed housing according to an additional exemplary embodiment.
Figure 5:
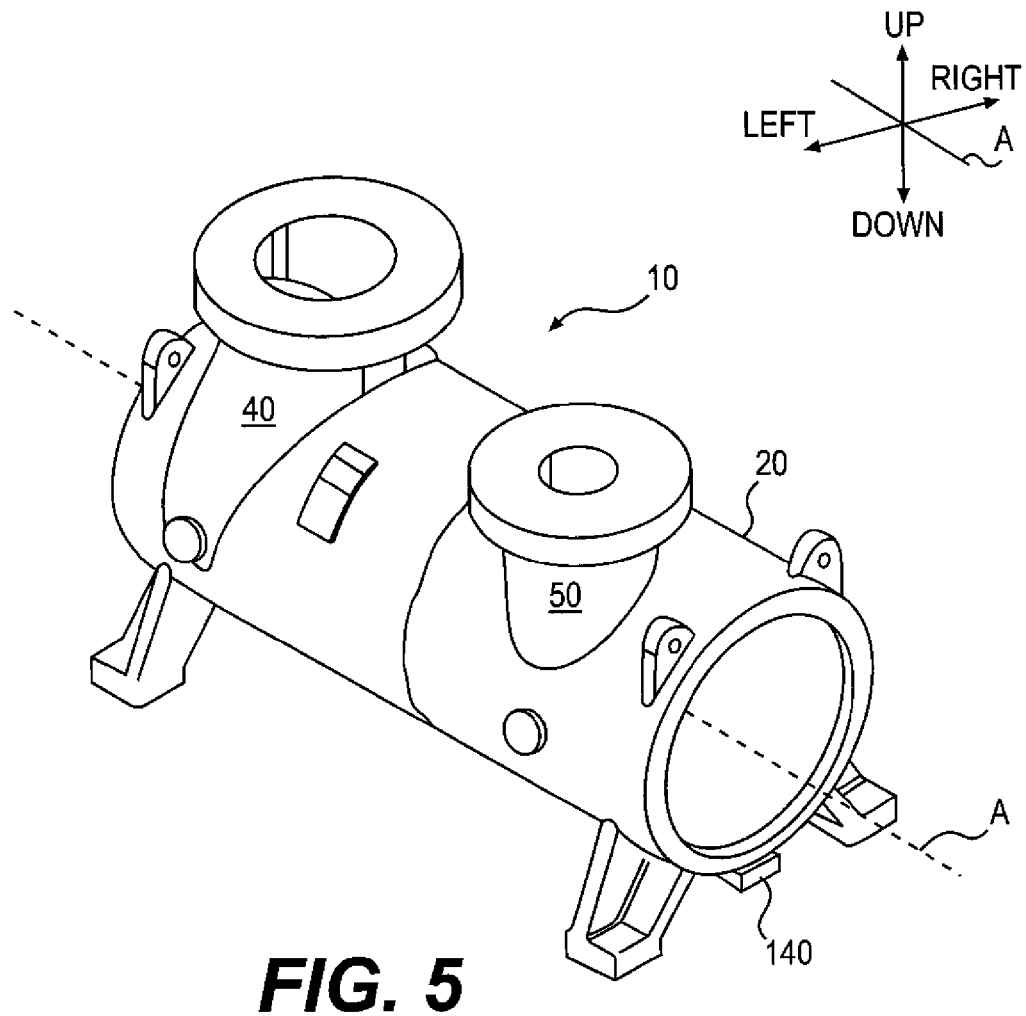
FIG. 5 is an illustration of a completed housing according to another exemplary embodiment.

FIG. 3, is an exemplary embodiment of a completed housing 10. In this embodiment, similar to the embodiments show in FIGS. 1 and 2, suction passage 40 is configured as a "left-hand" suction passage 40 with respect to the longitudinal axis A. In such an embodiment, discharge passage 50 may extend in a direction opposite to that of suction passage 40, i.e. in a "right-hand" direction with respect to the longitudinal axis A. Alternatively, discharge passage 50 may extend in the same direction as suction passage 40, i.e. the "left-hand" direction with respect to the longitudinal axis A. Different configurations are available. For example, as shown in FIG. 4, suction passage 40 is configured as a "right-hand" suction passage 40 with respect to the longitudinal axis A. In such an embodiment, discharge passage 50 may extend in a direction opposite to that of suction passage 40 i.e. in a "left-hand" direction with respect to the longitudinal axis A. Alternatively, discharge passage 50 may extend in the same direction as suction passage 40, i.e. the "right-hand" direction with respect to the longitudinal axis A. In another exemplary embodiment, as shown in FIG. 5, suction passage 40 may extend in an upward direction with respect to the longitudinal axis A. In this embodiment, discharge passage 50 may extend in the same direction, i.e. an upward direction with respect to the longitudinal axis A. Alternatively, discharge passage 50 may extend in a direction transverse to the direction of suction passage 40, i.e. a "left-hand" or "right hand" direction with respect to the longitudinal axis A. It is to be noted that any appropriate arrangement of suction passage 40 and discharge passage 50 may be utilized as needed for a specific use. For example, one or both of suction passage 40 and discharge passage 50 may be oriented at any appropriate angle with respect to the longitudinal axis A. By way of non-limiting example, one or both of suction passage 40 and discharge passage 50 may be oriented at an angle of 45° with respect to the longitudinal axis A. Alternative exemplary embodiments may orient one or both of suction passage 40 and discharge passage 50 along any appropriate angle as desired.

As shown in FIGS. 3-5, a protrusion 140 may be used in conjunction with housing 10. That is, protrusion 140 may be associated with an external surface of body 20 and be configured to facilitate attachment of a tool or rail system to enable removal of a component from and/or insertion into a bore 30 of body 20 as is known in the art.

INDUSTRIAL APPLICABILITY

The disclosed housing and method of producing the same may be applicable to any structural housing. Additionally, the disclosed method of producing the housing may be applicable to any system in which manufacturers have a short amount of time in which to manufacture the housing.

Figure 6:
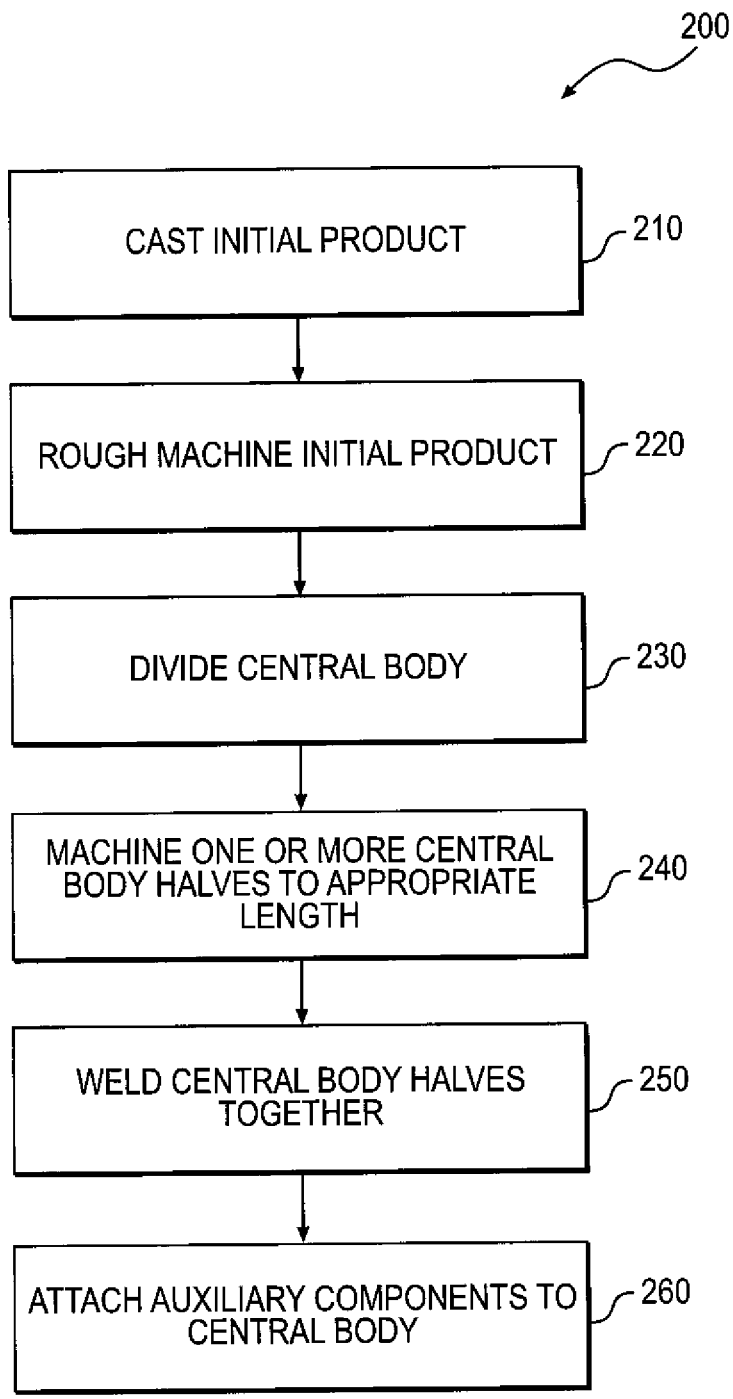
FIG. 6 is a flow chart illustrating an exemplary method of manufacturing an exemplary completed housing according to the present disclosure.

FIG. 6. illustrates a method 200 of producing a housing 10 according to an exemplary embodiment. As shown, the method includes the step of casting an initial product 210. That is, a producer may cast the housing 10 according to known casting techniques. As noted above, casting of the housing 10 includes integrally, i.e. monolithically casting body 20 with suction passage 40 and discharge passage 50. The initial product may be cast such that the housing 10 has a length L1. In other words, regardless of the desired length of the final product, the initial product is cast so as to have the maximum length of L1. Such a technique may allow for improved efficiency in the manufacturing process as will be described in further detail below.

Following the casting of the initial product, the method 200 may further include the step of rough machining the initial product 220. As such, the initially cast product may be grinded, sanded, or otherwise processed so as to remove excess casting materials and/or undesired sharp edges. Upon completion of step 220, the initial product may be stored in a manufacturer's inventory. That is, as will be described below, the rough machined initial product, including body 20, suction passage 40, and discharge passage 50 integrally, i.e. monolithically cast and having the maximum length L1, or alternatively, an originally cast length of L0, is ready for storage in a warehouse or otherwise. As such, once a specific order having particular needs is placed with the manufacturer, the product may be readily accessed in its initial product form and further processed to meet the demands of the order.

Upon receiving a specific order having particular needs, a manufacturer may determine whether or not the length L1 is appropriate and/or whether alternation of the orientation of suction passage 40 and/or discharge passage 50 is needed. That is, if the needs of an order require a length to be less than the maximum length L1, for example a length of L2, L3, or L4, the method may optionally include the step of dividing the central body 230. Indeed, as shown in FIG. 2, body 20 may be cut, sawed, or otherwise divided into suction passage portion 20A and discharge passage portion 20B. Alternatively, and as noted above, in an embodiment requiring a change in orientation of one or both of suction passage 40 and discharge passage 50 and desiring a final length of L1, body 20 may be cast to have an originally cast length of L0, L0 being longer than the maximum length L1. In such an embodiment, the method may include forming suction passage portion 20A and discharge passage portion 20B, and reorientation of suction passage 40 and/or discharge passage 50.

Next, the method may include the step of machining one or more of suction passage portion 20A and discharge passage portion 20B to an appropriate length 240. That is, if the body 20 is divided in step 230, either or both of suction passage portion 20A and discharge passage portion 20B may be grinded, sanded, or otherwise machined so as to reduce in length. In particular, the length of suction passage portion 20A and/or discharge passage portion 20B should be reduced such that when reattached to one another, a length of body 20 equals a desired length according to the specific order. For example, if the specific order requires a housing 10 having a length of L2, one or both of suction passage 20A and discharge passage 20B may be shortened so that upon reattachment, body 20 would have a length of L2.

Next, suction passage portion 20A and discharge passage portion 20B are reattached at step 250. In particular, suction passage portion 20A and discharge passage portion 20B may be welded to each other so as to form housing 10. Additionally, the method may include the step of welding auxiliary components to the body 260. That is, a plurality of feet 90, loops 100, and/or face plate(s) 110 may be attached to housing 10. Indeed, each of the feet 90, loops 100 and/or face plate(s) may be welded to body 20 so as to form a completed final product. Finally, if necessary, the completed housing 10 may be machined so as to remove any excess material and or sharp edges, if desired.

The presently disclosed housing 10 and method 200 of producing the same may have numerous features. Indeed, by producing a single casting (FIG. 1) having a length L1 and integrally including body 20, suction passage 40, and discharge passage 50, the manufacturing speed may be increased. That is, as a manufacturer/supplier may simply produce an initial product having a length L1 and store the initial product in inventory, the manufacturer/supplier may avoid time intensive casting procedures when faced with a shortened deadline. Said differently, because casting of the housing 10 may require a large amount of time, the presently disclosed method may allow a manufacturer/supplier to perform the casting prior to even receiving an order. Upon receiving an order having particular demands, the initially cast product may be machined to finalize the product in a short amount of time.

Additionally, the presently disclosed housing 10 and method 200 may reduce tooling costs. Since each initially cast product is cast so as to have the same length L1, being the maximum length any specific order may demand, the need for expensive expandable tools is eliminated. Further, the presently disclosed housing 10 and method 200 reduces casting defects and the need for subsequent repairs. Such repairs may include the need to fill appendages on a cast product. Such filling may cause porosity or shrinkage of the cast product which requires repair via subsequent welding and/or heat treating operations. Also, because a manufacturing facility (foundry) may consistently cast the same part, a higher volume of output may be achieved. Finally, since a manufacturing facility (foundry) is consistently casting the same part, their processes may be optimized for low cost and increased quality.

It will be apparent to those skilled in the art that various modifications and variations can be made to the disclosed product and method. Other embodiments will be apparent to those skilled in the art from consideration of the specification and practice of the disclosed embodiments. For example, rather than casting housing 10 as a single component, housing 10 may initially be cast in two portions, for example, suction passage portion 20A and discharge passage portion 20B. Alternatively, in another embodiment, the initial product may be cast having body 20 extending a length L1 and having suction passage 40 integrally formed therewith. Upon cutting the body to the appropriate length, discharge passage 50 may be welded thereon. It is intended that the specification and examples be considered as exemplary only, with a true scope being indicated by the following claims and their equivalents.

What is claimed is:

1. A method of manufacturing a plurality of housings comprising:
maintaining an inventory of initial products, each of said initial products including a central hollow body extending along a longitudinal axis and monolithically cast with a suction passage and a discharge passage, each of said initial products having a same initial length;
receiving a first order for a first housing having a first length;
machining a first product from the inventory of initial products to form the first housing having the first length by dividing the first product into a suction passage portion and a discharge passage portion;
receiving a second order for a second housing having a second length; and machining a second product from the inventory of initial products to form the second housing having the second length by dividing the second product into a suction passage portion and a discharge passage portion;

wherein the first length and the second length are different.

2. The method of claim 1, wherein the initial length is equal to the first length or the second length.

3. The method of claim 1, further including:

rough machining the inventory of initial products to remove at least one of excess material and sharp edges.

4. The method of claim 1, further including:

reducing a length of at least one of the suction passage portion and the discharge passage portion.

5. The method of claim 4, further including:

after the reducing, welding the suction passage portion and the discharge passage portion to each other thereby forming at least one of the first housing and the second housing.

6. The method of claim 5, further including:

attaching at least one of a plurality of support feet, a plurality of loops, and a face plate to at least one of the first housing and the second housing.

7. The method of claim 1, wherein each of the suction passage and discharge passage extend along a plane oriented at an angle with respect to the longitudinal axis.

* * * * *